(12) United States Patent
Sanchez et al.

(10) Patent No.: US 10,558,059 B1
(45) Date of Patent: Feb. 11, 2020

(54) EYEWEAR AND SYSTEMS FOR IMPROVEMENT OF WEARER COMFORT

(71) Applicant: Costa Del Mar, Inc., Daytona Beach, FL (US)

(72) Inventors: John Sanchez, Palm Coast, FL (US); Casey Lopez, Palm Coast, FL (US); Marc Tappeiner, Santa Barbara, CA (US)

(73) Assignee: Costa Del Mar, Inc., Daytona Beach, FL (US)

( * ) Notice: Subject to any disclaimer, the term of this patent is extended or adjusted under 35 U.S.C. 154(b) by 109 days.

(21) Appl. No.: 15/874,557

(22) Filed: Jan. 18, 2018

Related U.S. Application Data

(60) Provisional application No. 62/617,442, filed on Jan. 15, 2018.

(51) Int. Cl.
*G02C 11/08* (2006.01)
*G02C 5/14* (2006.01)

(52) U.S. Cl.
CPC .................... *G02C 5/143* (2013.01)

(58) Field of Classification Search
CPC ............... G02C 11/08; G02C 11/12
USPC ............... 351/62, 122, 123; 2/435
See application file for complete search history.

(56) References Cited

U.S. PATENT DOCUMENTS

| | | | |
|---|---|---|---|
| 2,269,037 A | 1/1942 | Oker |
| 2,403,223 A | 7/1946 | Kaesz |
| 2,482,195 A | 9/1949 | Martin |
| 2,749,800 A | 6/1956 | Gagnon |
| 2,781,693 A | 2/1957 | Brumby |
| 3,052,160 A | 9/1962 | Ratti |
| 3,395,406 A | 8/1968 | Smith |
| 3,724,934 A | 4/1973 | Bloom |
| 4,222,640 A | 9/1980 | Bononi |
| 4,345,824 A | 8/1982 | Duabignard |
| 4,470,674 A | 9/1984 | Piampiano |
| 4,665,598 A | 5/1987 | Murai et al. |
| 4,703,522 A | 11/1987 | Schürle |
| 5,042,934 A | 8/1991 | Nakanishi |
| 5,270,743 A | 12/1993 | Hofmair et al. |
| 5,343,259 A | 8/1994 | Nakanishi |
| 5,355,185 A | 10/1994 | Lee |
| 5,373,331 A | 12/1994 | Vallalla et al. |
| 5,423,092 A | 6/1995 | Kawai |
| 5,537,161 A | 7/1996 | Monroe |

(Continued)

OTHER PUBLICATIONS

Oakley, Radar® EV Pitch®, http://www.oakley.com/en/mens/sunglasses/radar-ev-pitch-product/W0OO9211/?skuCode=OO9211-03&variant=888392105264&categoryCode=m02 (accessed and printed May 16, 2019).

(Continued)

*Primary Examiner* — Hung X Dang
(74) *Attorney, Agent, or Firm* — Malloy & Malloy, P.L.

(57) ABSTRACT

An eyewear frame includes a plurality of ventilation apertures disposed in fluid communication with corresponding ones of a plurality of fluid channels. The plurality of ventilation apertures are dimensioned and configured to conduct fluid from an outer face of the ventilated eyewear frame to an inner face. The plurality of fluid channels are dimensioned and configured to conduct fluid therealong, and at least partially in communication with a wearer of the ventilated eyewear frame, facilitating heat exchange with the wearer.

24 Claims, 13 Drawing Sheets

(56) References Cited

U.S. PATENT DOCUMENTS

| | | | |
|---|---|---|---|
| 5,541,674 A | | 7/1996 | Jannard |
| 5,583,583 A | * | 12/1996 | Wilson ................ G02C 5/00 |
| | | | 351/122 |
| 5,608,469 A | | 3/1997 | Bollé |
| 5,764,333 A | | 6/1998 | Somsel |
| 5,768,716 A | | 6/1998 | Porsche |
| 5,815,235 A | | 9/1998 | Runckel |
| 5,898,468 A | * | 4/1999 | Mage ................ G02C 11/08 |
| | | | 351/41 |
| 5,903,331 A | | 5/1999 | Lin |
| 5,907,384 A | | 5/1999 | Kirsch et al. |
| 5,956,115 A | | 9/1999 | Bollé |
| 5,963,296 A | | 10/1999 | Matera |
| 6,056,399 A | | 5/2000 | Jannard et al. |
| 6,168,271 B1 | | 1/2001 | Houston et al. |
| 6,196,681 B1 | | 3/2001 | Canavan |
| 6,233,342 B1 | | 5/2001 | Fernandez |
| 6,253,388 B1 | | 7/2001 | Lando |
| 6,264,327 B1 | | 7/2001 | Copeland |
| 6,273,564 B1 | | 8/2001 | Wedeck et al. |
| 6,334,680 B1 | | 1/2002 | Larson |
| 6,561,647 B1 | | 5/2003 | Chen |
| 6,592,220 B1 | | 7/2003 | Cheong |
| 6,604,824 B2 | | 8/2003 | Larson |
| 6,637,877 B1 | | 10/2003 | Hartley et al. |
| 6,692,124 B2 | | 2/2004 | Katz et al. |
| 6,715,873 B2 | | 4/2004 | Nahmias |
| 6,729,725 B1 | | 5/2004 | Cheng |
| 6,767,095 B1 | | 7/2004 | Altelaar et al. |
| 6,783,235 B1 | | 8/2004 | Lin |
| 6,863,395 B1 | | 3/2005 | Teng |
| 6,890,073 B2 | | 5/2005 | DiChiara et al. |
| 7,036,927 B2 | | 5/2006 | Kopfer |
| 7,137,700 B2 | | 11/2006 | DiChiara et al. |
| 7,150,525 B1 | | 12/2006 | Yang |
| D552,663 S | | 10/2007 | Cheng |
| D555,703 S | | 11/2007 | Damen |
| 7,296,887 B1 | | 11/2007 | Hsiung |
| 7,481,529 B1 | | 1/2009 | Chen |
| 7,506,977 B1 | | 3/2009 | Aiiso |
| 7,648,233 B2 | | 1/2010 | Blanshay et al. |
| 7,712,894 B2 | | 5/2010 | Tsai |
| 7,856,673 B2 | | 12/2010 | Reed |
| 8,182,086 B2 | | 5/2012 | Cheong |
| D662,536 S | | 6/2012 | Shin |
| D748,720 S | | 2/2016 | Lee et al. |
| D763,944 S | | 8/2016 | Shin |
| D769,963 S | | 10/2016 | Shin |
| D775,266 S | | 12/2016 | Chen |
| D799,583 S | | 10/2017 | Earley |
| 2005/0007546 A1 | | 1/2005 | Pilat, Jr. et al. |
| 2005/0243271 A1 | | 11/2005 | Oura et al. |
| 2005/0280771 A1 | | 12/2005 | DiChiara et al. |
| 2006/0238698 A1 | | 10/2006 | Sheldon |
| 2006/0238700 A1 | | 10/2006 | Del Vecchio |
| 2006/0268218 A1 | | 11/2006 | Medana |
| 2007/0013863 A1 | | 1/2007 | Zelazowski |
| 2007/0261155 A1 | | 11/2007 | Tabacchi |
| 2010/0064422 A1 | | 3/2010 | DiChiara |
| 2010/0085533 A1 | | 4/2010 | Calilung et al. |
| 2014/0340628 A1 | | 12/2014 | Huang |

OTHER PUBLICATIONS

Oakley, Jawbreaker®, http://www.oakley.com/en/mens/sunglasses/jawbreaker-prizm-trail/product/W0OO9290PZTL/?skuCode=OO9290-2531&variant=888392262035&CategoryCode=m02 (accessed and printed May 16, 2019).

Oakley, Crossrange™ Patch (Asia Fit), http://www.oakley.com/en/mens/sunglasses/crossrange-patch-prizm-asia-fit-/product/W0OO9391APZ/?skuCode=OO9391-0360&variant=888392296504&categoryCode=m02 (accessed and printed May 16, 2019).

Nike, Nike Hyperforce Elite, https://www.nikevision.com/us/en/products/detail/nike-hyperforce-elite/#EV1026_070 {accessed and printed May 16, 2019}.

Fathom, GlassMirror Lens. Costa Del Mar. Downloaded Dec. 7, 2006 at http://www.eyeglasses.com/product/1091472073-1091472073.

José, Blue Mirror Lens. Costa Del Mar. Downloaded Apr. 20, 2012 at http://www.costadelmar.com/shop/sunglasses/jose.

Cheeca, Copper Lens. Costa Del Mar. Downloaded Apr. 20, 2012 at http://www.costadelmar.com/shop/sunglasses/cheeca.

Bonita, Gray Lens. Costa Del Mar. Downloaded Apr. 20, 2012 at http://www.costadelmar.com/shop/sunglasses/bonita.

Native Product Catalog Two Thousand Thirteen. Costa Del Mar. 2012. pp. 6-7.

Costa 2013 Workbook. Costa Del Mar. 2012. pp. 14-19.

Costa Del Mar Bloke Sunglasses, posted at amazon.com, posting date Oct. 31, 2016, [online], [site visited Dec. 11, 2017]. Available from Internet, URL: https://www.amazon.com/gp/product/B01M4QFHTR/.

Costa Del Mar Reefton Sunglasses, posted at dickssportinggoods.com, posting date not given, [online], [site visited Dec. 11, 2017]. Available from Internet, URL: https://www.dicksportinggoods.com/p/costa-del-mar-reefton-580p-polarized-sunglasses-17cdeurftnmttrtgsgs/17cdeurftnmtttrtgsgs.

Costa Del Mar Polarized Sunglasses, posted at dickssportinggoods, posting date not given, [online], [site visited Dec. 4, 2017]. Available from Internet, URL: https://www.dickssportinggoods.com/p/costa-del-mar-mens-fantail-sunglasses-16demfntlsrdblmrsgs/16cdemfntlsrdblmrsgs.

Cruz Matte Gold, posted at diffeyewear.com, posting date not given, [online], [site visited Nov. 30, 2017]. Available from Internet, URL: https://www.diffeyewear.com/products/cruz-matte-gold-frame-brown-gradient-lensffeyewear.com.

Field & Stream Breakpoint Sunglasses, posted at dickssportinggoods.com, posting date not given, [online], [site visited Dec. 11, 2017]. Available from Internet, URL: https://www.dickssportinggoods.com/p/field-stream-breakpoint-polarized-sunglasses-16fnsmbrkpntblksmsgs/16fnsmbrkpntblksmsgs.

G&G Polarized Square Aviator, posted at amazon.com, posting date Jul. 11, 2014 [online], [site visited Dec. 2, 2017]. Available from Internet, URL: https://www.amazon.com/Polarized-Square-Aviator-Sunglasses/dp/B00LPQVIMC.

Givenchy Flat Top Sunglasses, posted at shopbop.com, posting date not given, [online], [site visited Dec. 1, 2017]. Available from Internet, URL: https://www.shopbop.com/flat-top-sunglasses-givenchy/vp/v=1/1530803009.htm.

Guess Mens GU6835 Sunglasses, posted at amazon.com, posting date Apr. 19, 2016, [online], [site visited Dec. 2, 2017]. Available from Internet, URL: https://www.amazon.com/Guess-Mens-GU6835-Rectangular-Sunglasses/dp/B01EI1UYIE.

Lionel Eyeglasses, posted by warbyparker.com, posting date not given, [online], [site visited Nov. 30, 2017]. Available from Internet, URL: https://www.warbyparker.com/eyeglasses/men/lionel/jet-silver.

Maui Jim Stingray, posted at amazon.com, posting date Mar. 12, 2003, [online], [site visited Dec. 4, 2017]. Available from Internet, URL: https://www.amazon.com/Maui-Jim-Sunglasses-Stingray-Polarized/dp/B002FU6T8U/.

Piper Sunglasses, posted at costadelmar.com, posting date not given, [online], [site visited Nov. 30, 2017]. Available from Internet, URL: https://www.costadelmar.com/us/en/men/sunglasses/view-all/piper/PIP.html.

Premium Asian Fit Sports Square Aviator Sunglasses, posted at shopzerouv.com, posting date not given, [online], [site visited Dec. 2, 2017]. Available from Internet, URL: https://www.shopzerouv.com/collections/avaitor-sunglasses/products/premium-asian-fit-sports-metal-frame-square-aviator-sunglasses-8529.

Saint Laurent SL1 Flat Top Sunglasses, posted at nordstrom.com, posting date not given, [online], [site visited Dec. 1, 2017]. Available from Internet, URL: https://shop.nordstrom.com/s/saint-laurent-sl1-59mm-flat-top-sunglasses/4247673.

Saint Laurent Combi Flat Top Sunglasses, posted at nordstrom.com, posting date not given, [online], [site visited Dec. 1, 2017]. Avail-

(56) References Cited

OTHER PUBLICATIONS able from Internet, URL: https://shop.nordstrom.com/s/saint-laurent-combi-59mm-flat-top-sunglasses/4796172.
Serengeti Pareto Sunglasses, posted at amazon.com, posting date not given, [online], [site visited Dec. 2, 2017]. Available from Internet, URL: https://www.amazon.com/Serengeti-Pareto-Sunglasses-Polar-Drivers/dp/B007OXZ3TE/.
Suncloud Conductor Polarized Sunglasses, posting at amazon.com, posting date not given, [online], [site visited Dec. 4, 2017]. Available from Internet, URL: https://www.amazon.com/Suncloud-S-CDPPBRTT-P-Conductor-Polarized-Sunglasses/dp/B00BY39VW.
Super Dark Black Lens Sunglasses, posted at amazon.com, posting date Aug. 30, 2013, [online], [site visited Dec. 1, 2017]. Available from Internet, URL: https://www.amazon.com/SUPER-Black-Sunglasses-Square-Oversized/dp/B00EVYYLNI.
Thom Browne Gold Aviator Glasses, posted at ssense.com, posting date not given, [online], [site visited Nov. 30, 2017]. Available from Internet, URL: https://ssense.com/en-us/women/product/thom-browne/gold-aviator-glasses/2041893.
TOMS Unisex Navigator, posted at amazon.com, posting date Apr. 9, 2015, [online], [site visited Dec. 2, 2017]. Available from Internet, URL: https://www.amazon.com/TOMS-Unisex-Navigator/dp/B01F2OGJB2.
Victoria Beckam Gold Grooved Aviator Glasses, posted at ssense.com, posting date not given, [online], [site visited Nov. 30, 2017]. Available from Internet, URL: https://www.ssense.com/en-us/women/product/victoria-beckham/gold-grooved-aviator-glasses/2466238.

\* cited by examiner

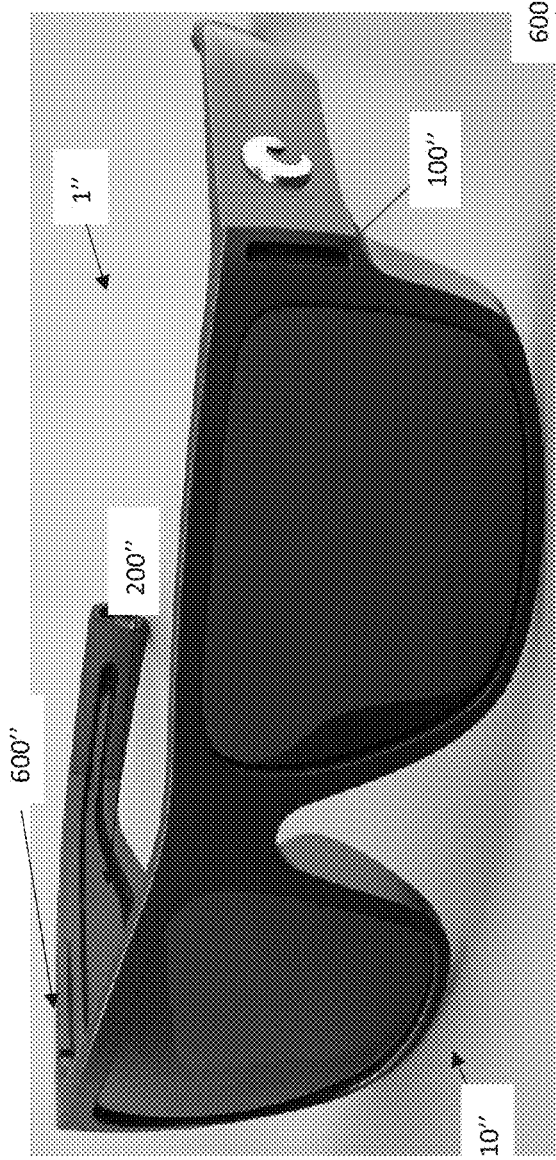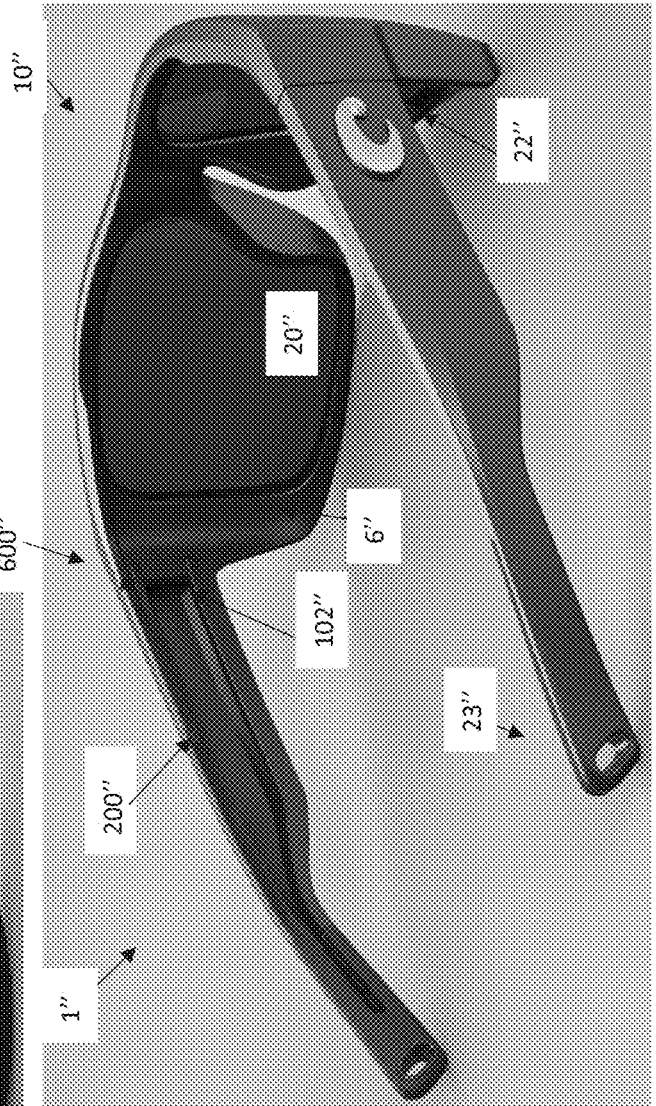
FIG. 3A
FIG. 3B

EYEWEAR AND SYSTEMS FOR IMPROVEMENT OF WEARER COMFORT

CLAIM OF PRIORITY

The present Non-Provisional patent application claims priority pursuant to 35 U.S.C. Section 119(e) to a prior filed Provisional patent application, namely, that having Ser. No. 62/617,442 filed on Jan. 15, 2018, the contents of which is incorporated herein by reference in its entirety.

BACKGROUND OF THE INVENTION

Field of the Invention

The invention is directed to eyewear incorporating various features and elements for management of light, heat, and moisture thereby improving wearer comfort.

Description of the Related Art

In designing eyewear for active or sporting purposes, there may be a variety of criteria to satisfy the functional objectives of the design. In bright, hot environments, such as may be common to sport fishing, the management of light, heat, and moisture are important to the comfort of the wearer, yet accomplishing these objectives can sometimes run contrary to one another.

By way of example, in order to effectively manage the amount of light reaching a wearer's cornea, it is desirable not only to utilize quality lenses, but to position those lenses properly relative to the wearer, and construct the frame to block peripheral light that may enter around the lenses. In this regard, the eyewear frame may be constructed to substantially conform to a wearer's face, in order to reduce the incidence of light leakage about the periphery of the frame. Moreover, a temple bar of the eyewear may be constructed of sufficient dimension to block light that would otherwise reach the wearer's cornea.

Yet these features that tend to block peripheral light also restrict fluid flow behind and/or underneath the eyewear. For instance, air flow may be restricted due to the close conformity of the frame and temple bars to a wearer's head and face, significantly reducing convective heat transfer in those regions that is necessary to evaporate perspiration and cool the wearer. Such an arrangement can lead to condensation build up on the interior of the lenses. Additionally, perspiration may become trapped under the frame or temple bars and, because air flow is limited, any such perspiration will not evaporate efficiently. Similarly, depending upon the configuration of the eye wire and the shape of the wearer's cheek, perspiration may collect at the bottom of the frames if trapped between the lower portion of the eye wire and the wearer's cheek.

Some of these concerns with heat and perspiration management have been addressed in the industry by minimizing the size of the frame and temple arms, and/or enlarging the lenses to wrap substantially past the wearer's peripheral vision. However, as some light still reaches the wearer through the lens from the periphery, this design does not manage light as efficiently as a design with larger frame portions designed to block peripheral light. Attempts to place ventilation holes through the frame and/or temple bars lead to peripheral light leakage as well.

Other attempts to address these concerns have eliminated the eye wire completely from the bottom of the frame, and merely secure the lenses to the frame at the top portion of the lenses. While such a configuration may lend itself to increased air flow, it still does not manage light effectively and also suffers from decreased impact resistance. A complete eye wire, which fully surrounds the lens, is desired for maximum impact resistance.

As such, there is a need in the art for eyewear that fosters fluid flow behind and underneath the frames, without sacrificing light management capabilities, and may provide other features and advantages.

SUMMARY OF THE INVENTION

The present invention is directed to eyewear incorporating various features and elements which increase wearer comfort, generally with respect to heat and moisture management, without significant sacrifice to the eyewear frame's light management capability. Moreover, the features and elements disclosed herein may be incorporated into a variety of eyewear styles using known construction methods, such that the invention may be incorporated into existing eyewear frames without significant cost or complexity. Additionally, the present invention may be deployed on a variety of different eyewear frames, including but certainly not limited to sunglass frames, ophthalmic frames, safety glass frames, goggles, and the like.

Accordingly, one objective of the present invention is to facilitate fluid flow behind and underneath the front element and temple bar of the eyewear frame. In one embodiment, one or more ventilation apertures are disposed within the eyewear frame and are configured and dimensioned to direct airflow from the outer face of the eyewear frame to at least the inner face of the eyewear frame. In at least one embodiment, the ventilation apertures include an inlet disposed on an outer face of either the front element or temple bar, and an outlet disposed on an inner face of either the front element or temple bar.

In a preferred embodiment, the inlet and outlet are configured and dimensioned to obscure peripheral light travelling in the direction of a wearer's cornea. As such, the ventilation aperture may be oriented substantially perpendicular to the front surface of the eyewear frame, thereby occluding light from traveling inward toward a wearer's cornea. Additionally, or alternatively, the ventilation aperture may be positioned such that when a wearer places the eyewear frame on the wearer's face, the ventilation apertures are situated behind the wearer's cornea, even further reducing the incidence of light entering a wearer's cornea from the periphery. As may be appreciated, disposing the ventilation apertures on the eyewear frame proximally to the lenses allows for a substantially perpendicular orientation of the ventilation aperture through the eyewear frame, while disposing the ventilation aperture on the temple bars facilitates relative positioning of the ventilation aperture behind a wearer's cornea. The optimal placement of the ventilation aperture, with the foregoing considerations in mind, will vary depending upon the shape and dimension of the eyewear frame, but many variations can be accomplished without departing from the spirit and scope of the invention. Additionally, the precise geometry of the ventilation aperture, including but not limited to its shape and size, may be varied to accommodate other considerations, such as aesthetic qualities of the eyewear frame.

Yet another feature of the present invention is the introduction of a fluid channel within the temple bar. In at least one embodiment, a fluid channel is disposed within the inner face of the temple bar and runs substantially from the proximal end, where the temple bar adjoins the eyewear frame, to the distal end of the temple bar. As such, air flow conducted to the inner face of the eyewear frames by the ventilation apertures is now available to be further conducted along the fluid channel, in communication with the face and/or head of a wearer, thereby facilitating heat exchange and moisture evaporation from the wearer. It will be appreciated that the fluid channel need not be open and disposed in fluid communication with the wearer along its entire length, and instead, only a portion of it may be open, while the remainder is enclosed within the temple bar. Moreover, the fluid channel need not extend the entire length of the temple bar, and may terminate at an intermediate point.

In a preferred embodiment, the ventilation aperture and fluid channel are correspondingly dimensioned and configured to facilitate direct fluid communication from the ventilation aperture to the fluid channel. By way of example, the outlet of the ventilation aperture may be disposed to conduct air directly into the fluid channel. However, such direct fluid communication is not required to accomplish the principles and objectives of the present invention.

In another embodiment, the fluid channel is dimensioned and configured to facilitate fluid communication with a wearer's head and/or face and additionally, to conduct fluid from the wearer along the length of the fluid channel.

Even in the event that no fluid enters directly though the ventilation aperture and into the fluid channel, fluid moving about the outer face of the eyewear may still generate a pressure and/or velocity differential relative to the inner face of the eyewear which is sufficient to motivate fluid along the fluid channel and/or through the ventilation aperture.

In yet another embodiment, a drain aperture may be disposed through the temple bar at a distal end of the temple bar and further, in fluid communication with the fluid channel. To the extent that moisture trapped within the fluid channel is not evaporated, it may also be conducted along the channel and out the drain aperture. In further embodiments, the drain aperture may be dimensioned and configured to accept retention loops for lanyards, eyewear retention cords, and the like.

Yet another feature of the present invention includes an eye wire of substantially reduced thickness on the inner face in order to reduce the potential for moisture to "pool" or collect at the bottom of the eyewear frames and against a wearer's cheek. In a preferred embodiment, it is not necessary that the entire eye wire be of reduced thickness, rather, only the lower portions of the eye wire need substantially conform to the lens in order to provide a relief point for drainage of fluid. Accordingly, thicker portions of the eye wire, in areas not required for drainage, may contribute to rigidity of the frame and further secure the lens.

Yet another feature of the present invention is the incorporation of ridges into rubber or rubberized gripping points, such as the nose rubber and temple bar rubber. The ridges facilitate drainage of moisture and increase mechanical grip on the user's face when perspiring. As such, slippage is reduced, and thereby the wearer is alleviated from constant adjustment of the eyewear frames during, e.g., excessive perspiration. Moreover, because the mechanical grip of the eyewear on the wearer is increased, the spring pressure exerted by the eyewear frames on the wearer, e.g. at nose pads or along the mastoid bone, necessary to overcome gravity can be reduced, and therefore, the comfort of the wearer is increased.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 3A is a perspective view of eyewear in accordance with another embodiment of the present invention.

FIG. 3B is a perspective view of the embodiment depicted in FIG. 3A.

Like reference numerals refer to like parts throughout the several views of the drawings.

DETAILED DESCRIPTION OF THE PREFERRED EMBODIMENT

Figure 1A:
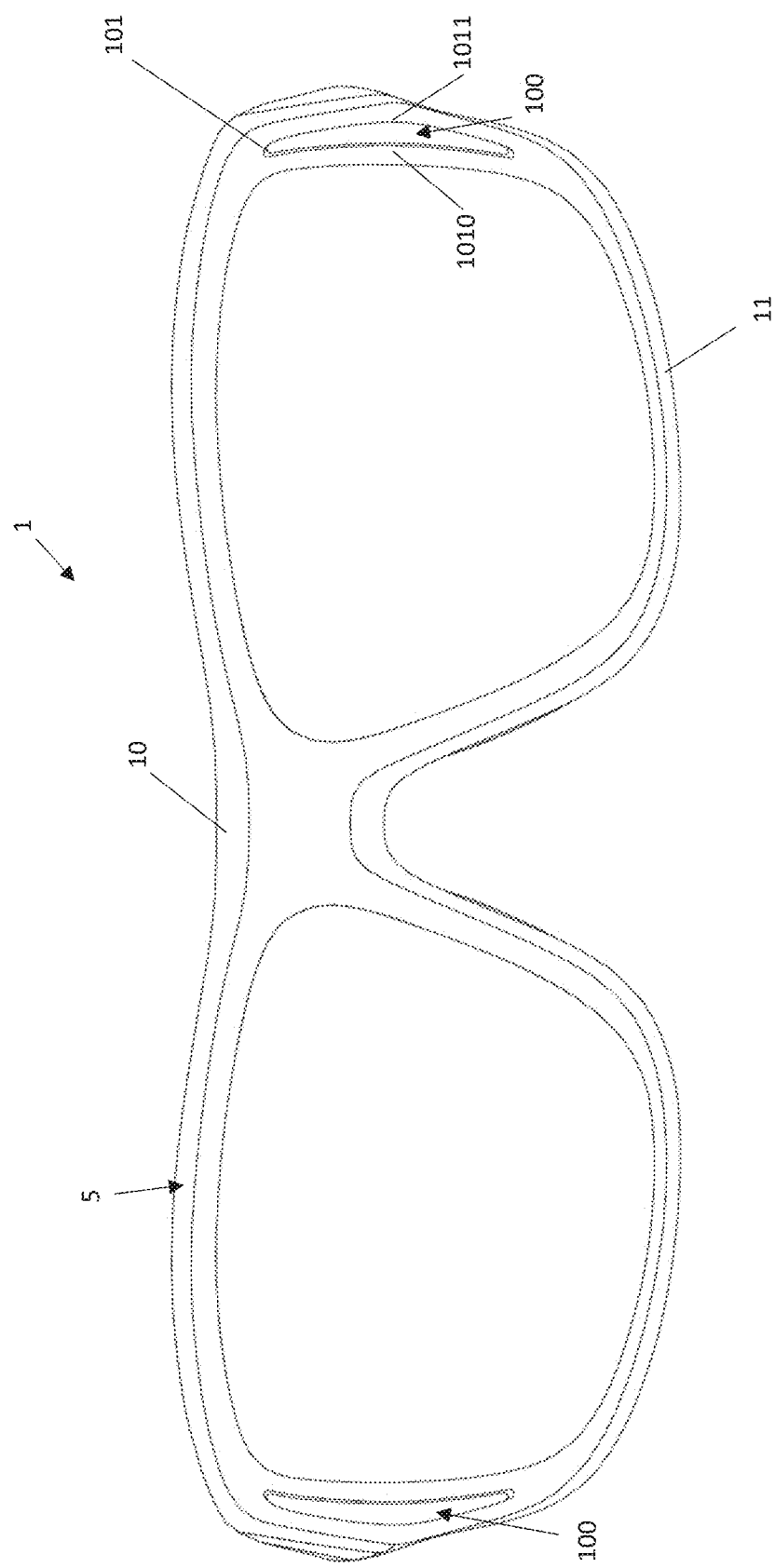
FIG. 1A is a front view of eyewear in accordance with one embodiment of the present invention.

Turning to FIGS. 1A-1F, depicted therein are several operative features of the invention employed on a particular embodiment of a frame 1. The frame 1 includes an outer face 5, inner face 6, a front element 10, and a pair of temple bars 20. As can be seen in the depicted embodiment, the inlet 101 of the ventilation aperture 100 is disposed on the front element 10, adjacent to the eye wire 11. The outlet 102 is disposed in direct, fluid communication with the fluid channel 200. Additionally, the ventilation aperture 100 is oriented substantially in alignment with the fluid channel 200 such that air may be conducted directly to the fluid channel 200 without significant deviation.

Figure 1B:
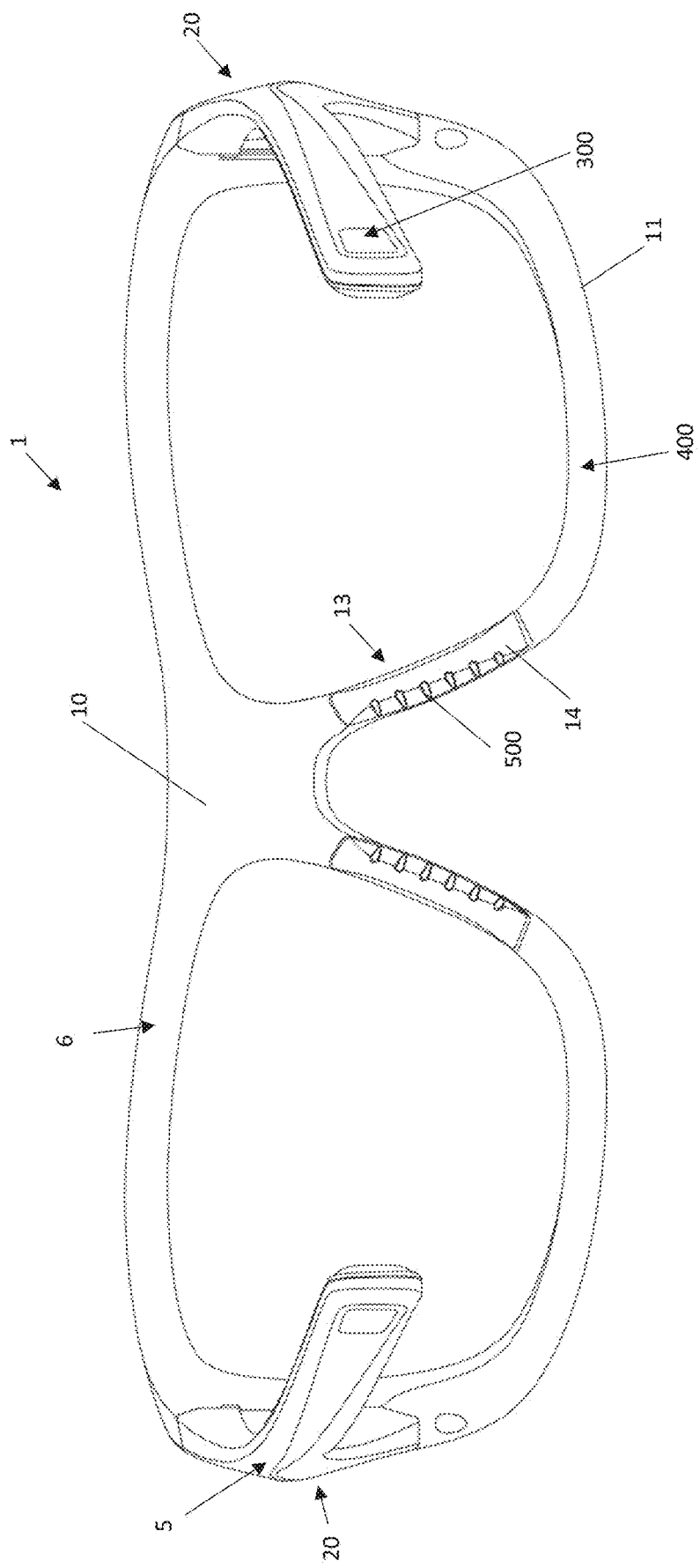
FIG. 1B is a rear view of the embodiment depicted in FIG. 1A.
Figure 1C:
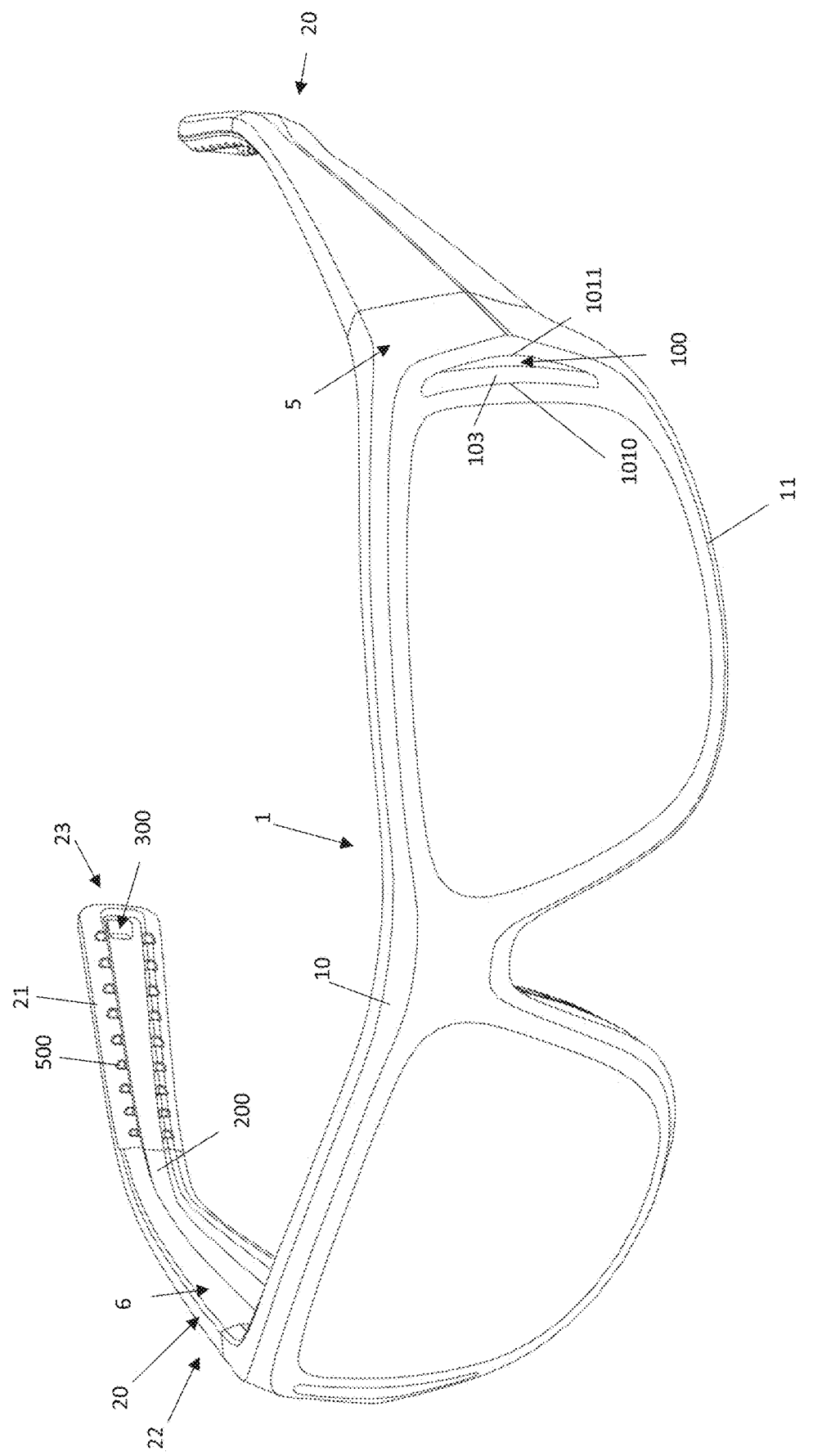
FIG. 1C is a perspective view of the embodiment depicted in FIGS. 1A-1B.
Figure 1D:
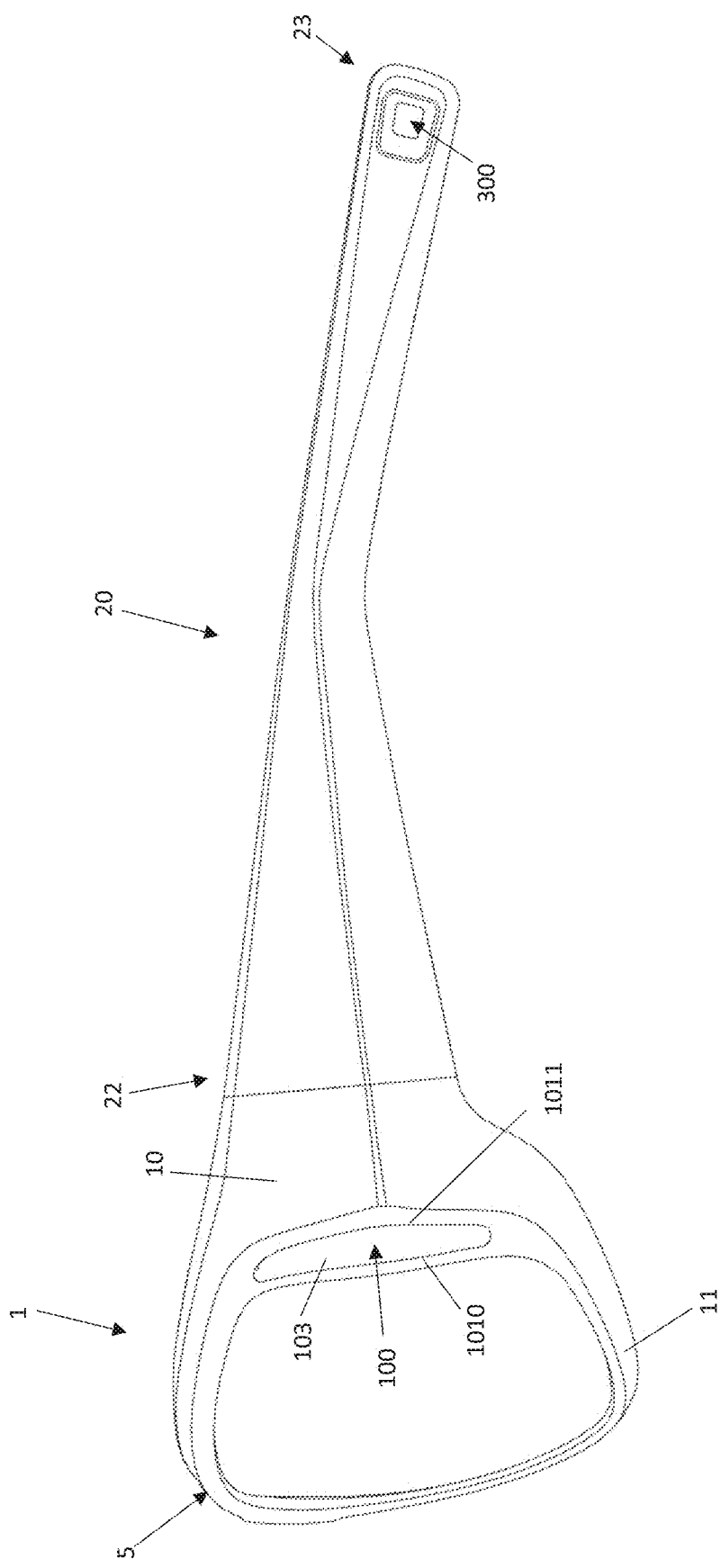
FIG. 1D is a side view of the embodiment depicted in FIGS. 1A-1C.
Figure 1E:
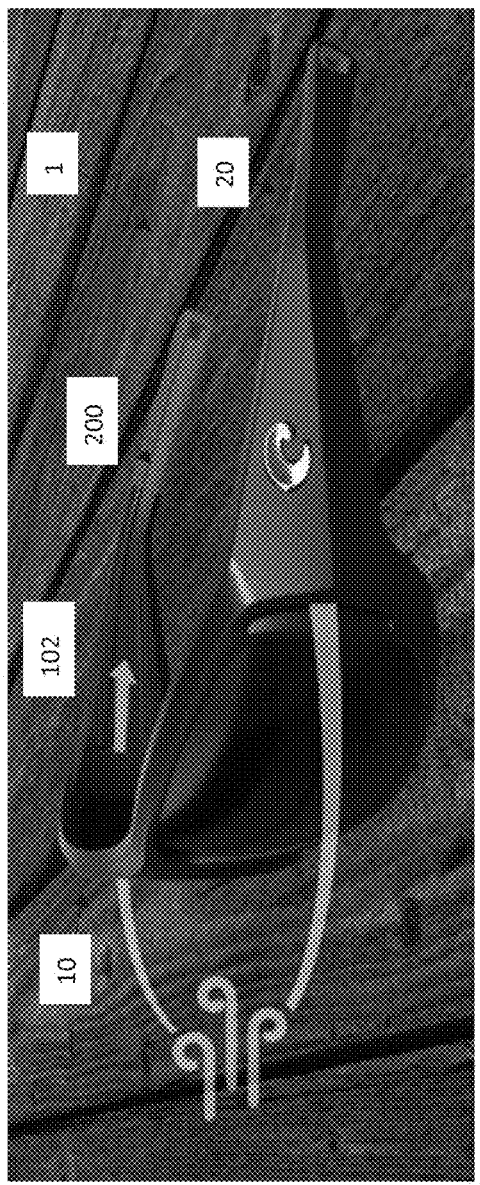
FIG. 1E is a perspective view of the embodiment depicted in FIGS. 1A-1D.

Particularly as can be seen in FIG. 1D, the ventilation aperture 100 of the depicted embodiment includes a length at least partially defined by an interior surface 103. Additionally, the proximal side 1010 of the inlet 101 is disposed further forward than the distal side 1011 of the inlet. While this facilitates capture and redirection of flowing air into the front element 10, it also creates an aperture with significant exposure to light and elements. As such, the interior surface 103 of the ventilation aperture 100 extends rearward past the distal side 1011 of the inlet 101. Accordingly, any light, fluid, or debris that would otherwise enter the aperture at an angle sufficient to meet the wearer's cornea is blocked from doing so. Any such light, fluid, or debris is either reflected off of the interior surface 103 or refracted or redirected along a path substantially along the fluid channel 200, and substantially away from the wearer's cornea.

In the depicted embodiment, the fluid channel 200 is disposed within the temple bar 20 along the inner face 6 thereof. The fluid channel 200 meets the outlet 102 at the proximal end 22 of the temple bar 20. The fluid channel 200 runs substantially along the length of the temple bar 20 and terminates at the distal end 23 of the temple bar 20. As can be seen, the depth of the fluid channel 200 is less than the thickness of the temple bar 20. As such, the fluid channel 200 of the depicted embodiment is defined substantially by a void within the temple bar 20, but does not extend all the way through the temple bar 20. As such, ventilation may be provided for within the temple bar 20 without including apertures therethrough.

At the distal end 23 of the temple bar 20, a drain aperture 300 is disposed through the temple bar 20 and in fluid communication with the fluid channel 200. As such, fluid, including air, perspiration, or other moisture, may flow along the fluid channel 200, conducted by the air entering through the ventilation aperture 100, and urge fluid out of the drain aperture 300, to the extent that it does not evaporate.

Figure 1F:
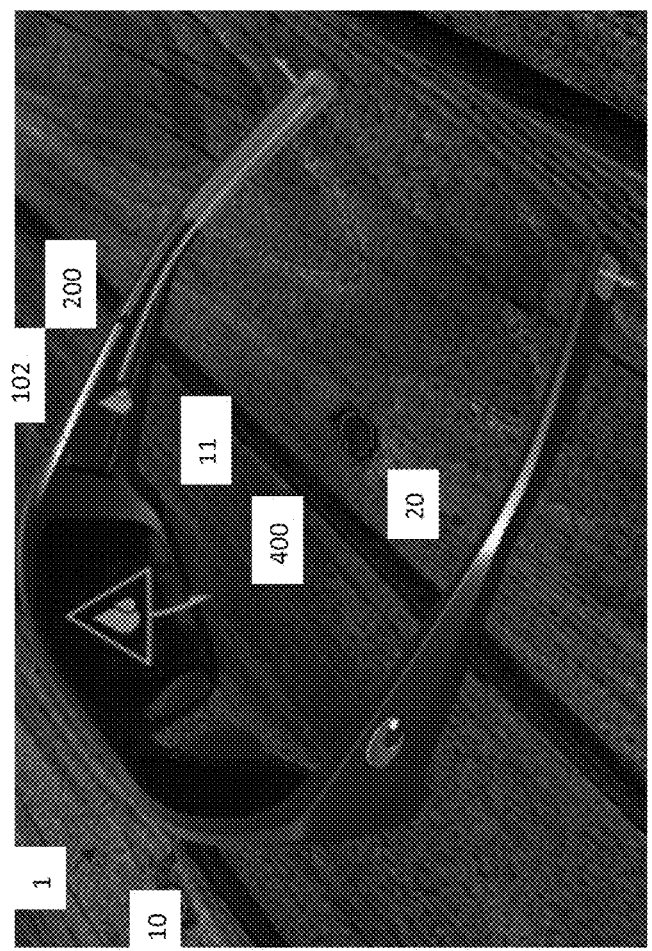
FIG. 1F is a perspective view of the embodiment depicted in FIGS. 1A-1E.
Figure 2A:
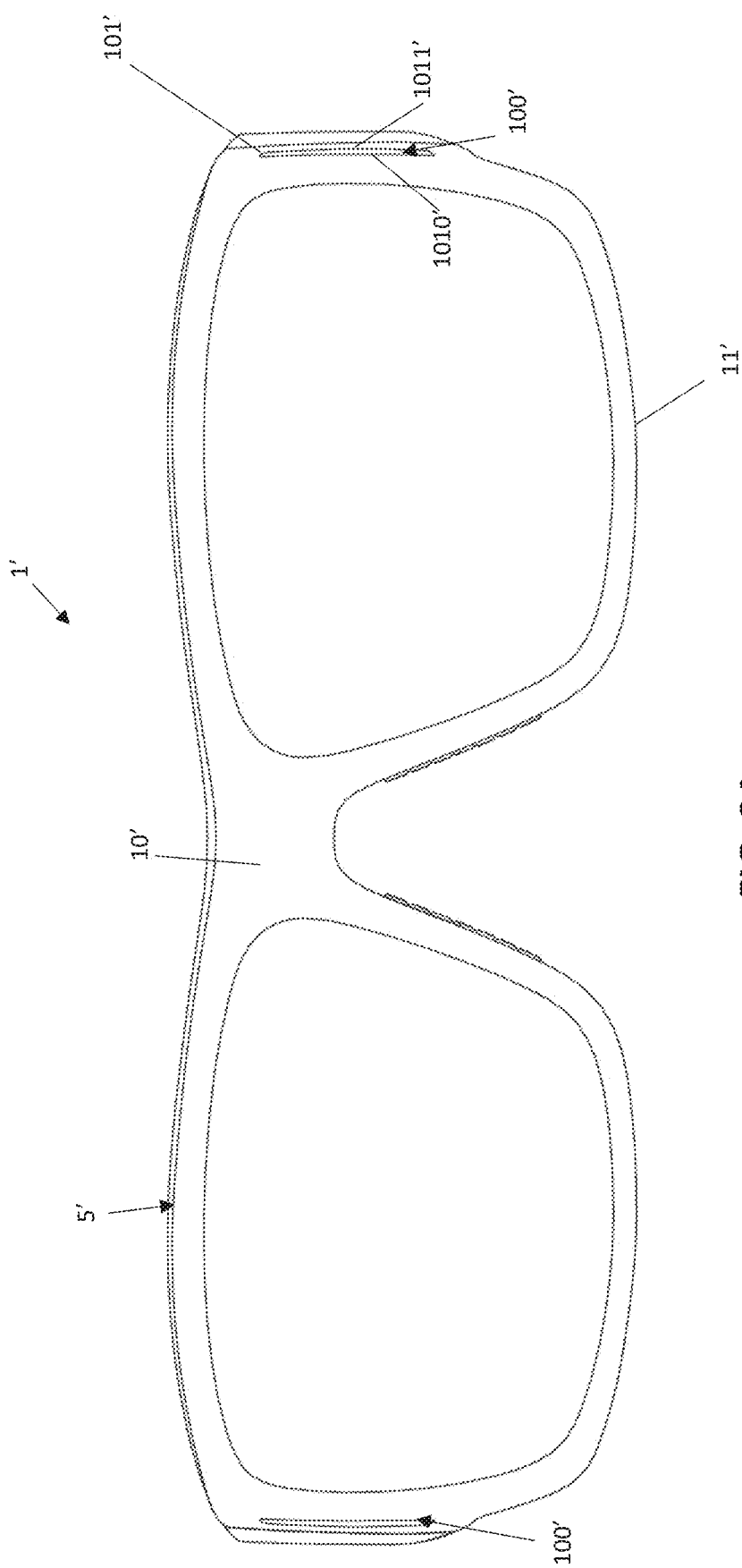
FIG. 2A is a front view of eyewear in accordance with another embodiment of the present invention.
Figure 2B:
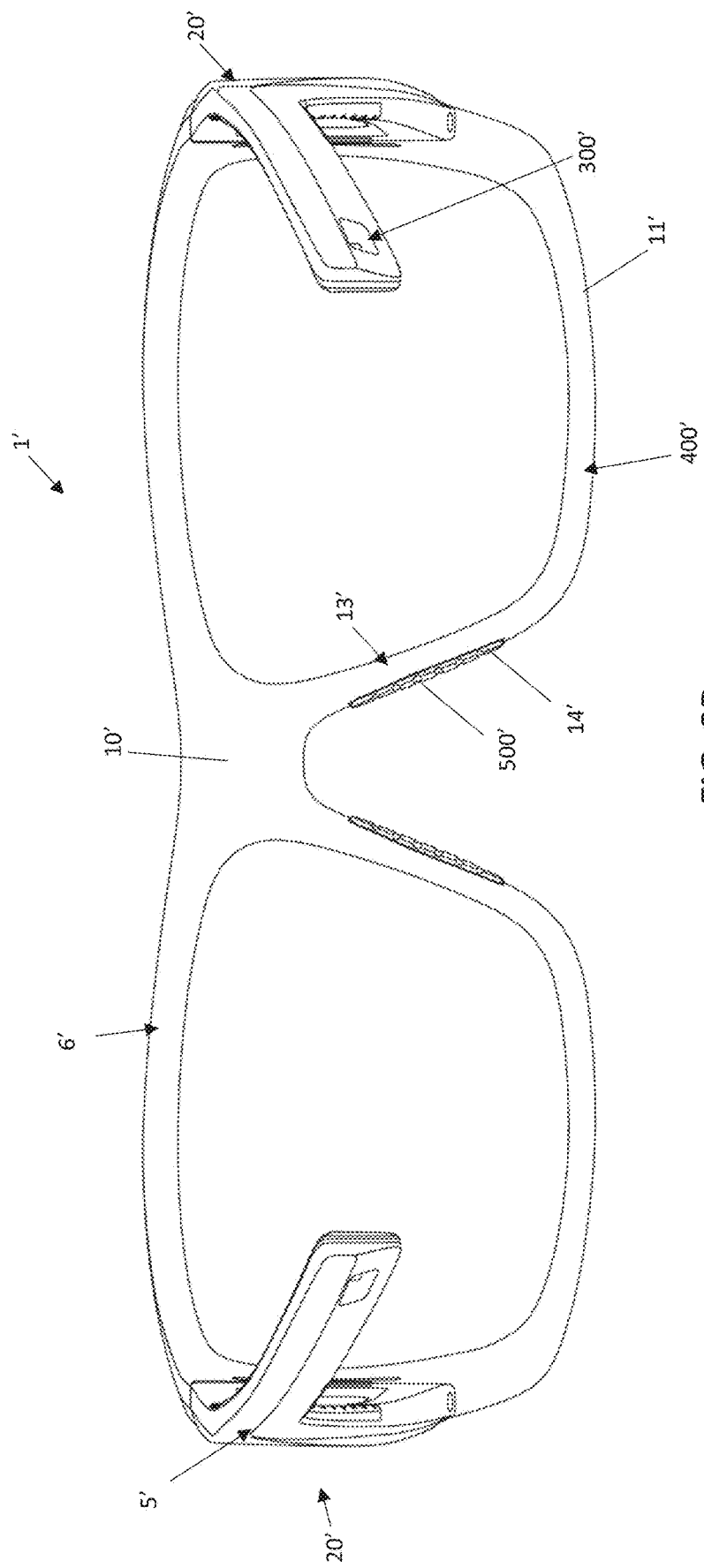
FIG. 2B is a rear view of the embodiment depicted in FIG. 2A.
Figure 2C:
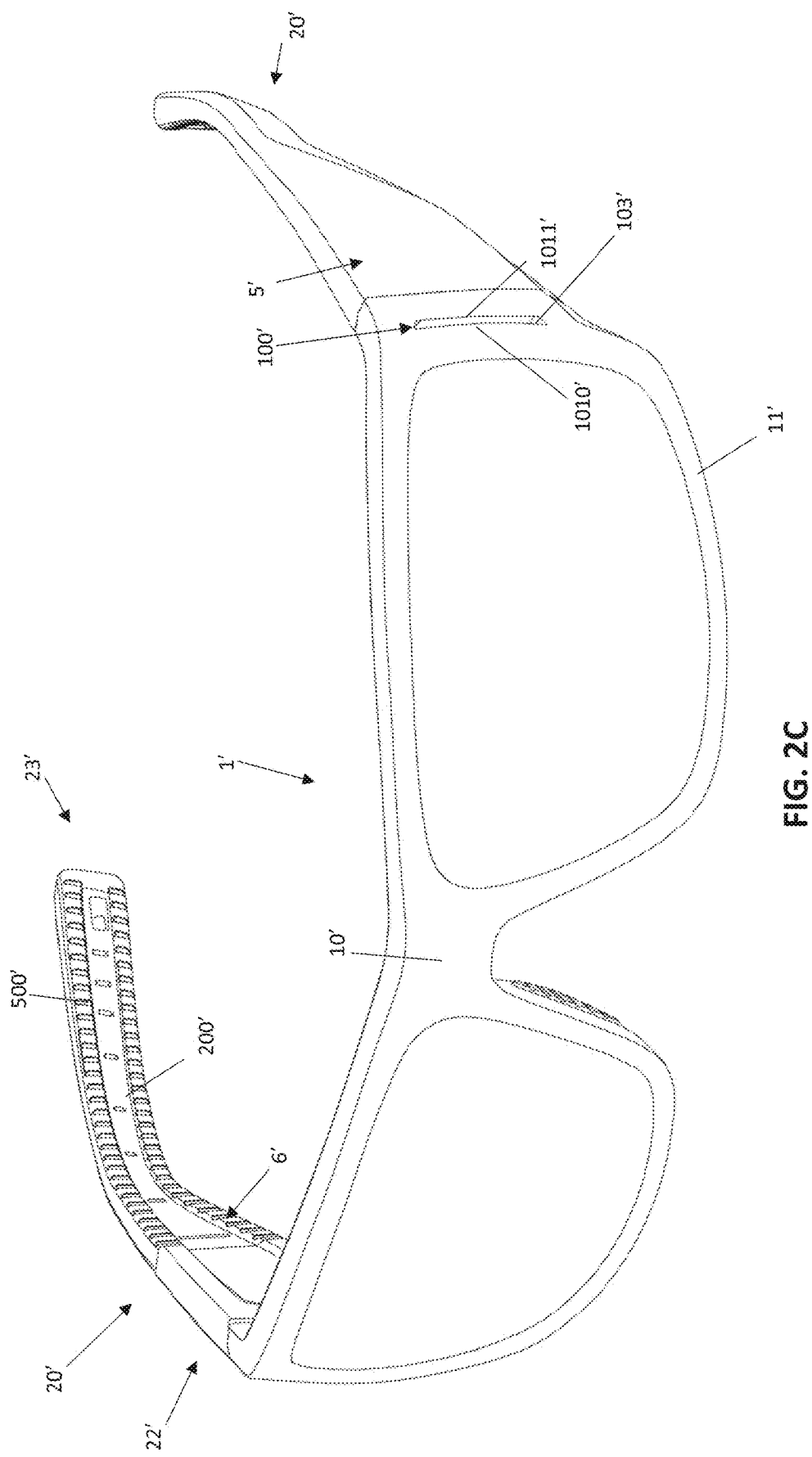
FIG. 2C is a perspective view of the embodiment depicted in FIGS. 2A-2B.
Figure 2D:
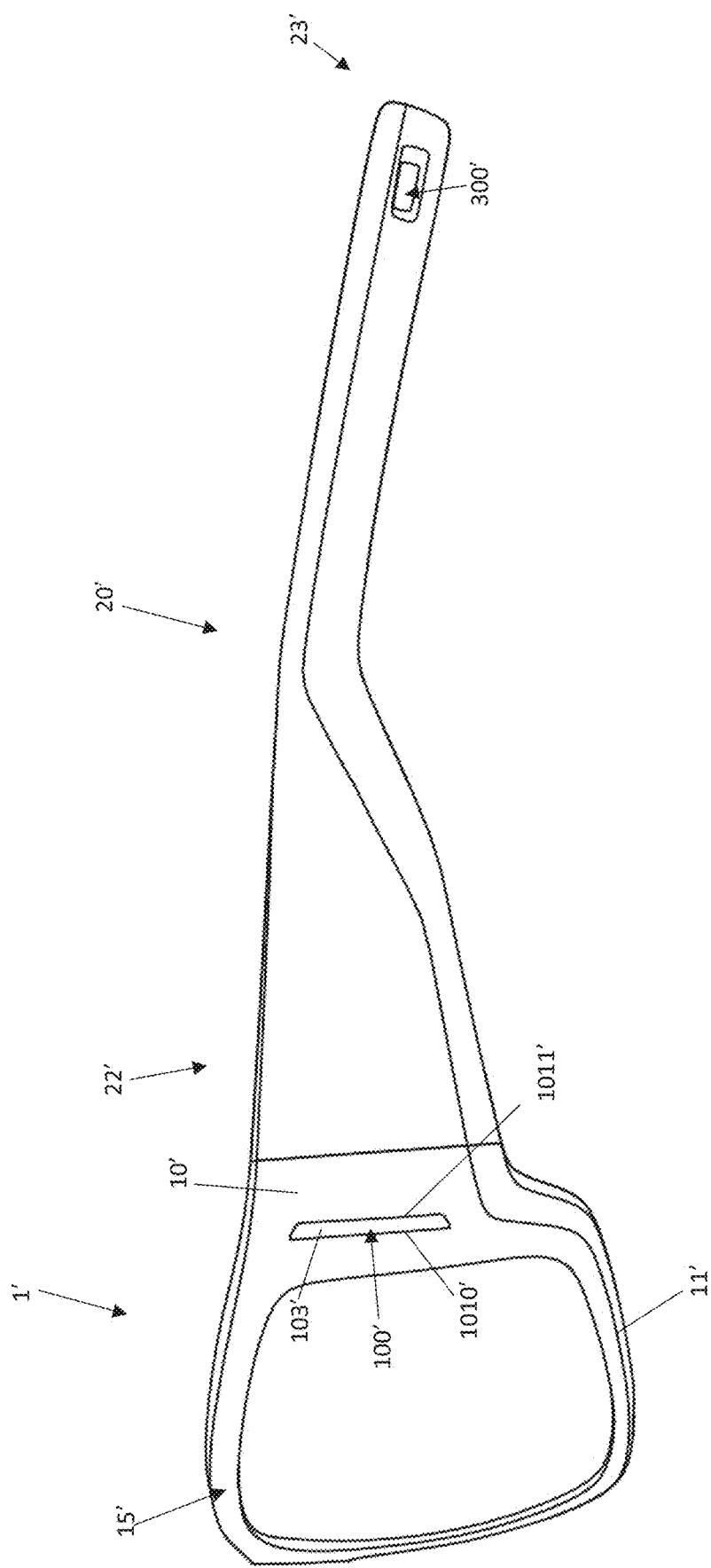
FIG. 2D is a side view of the embodiment depicted in FIGS. 2A-2C.
Figure 2E:
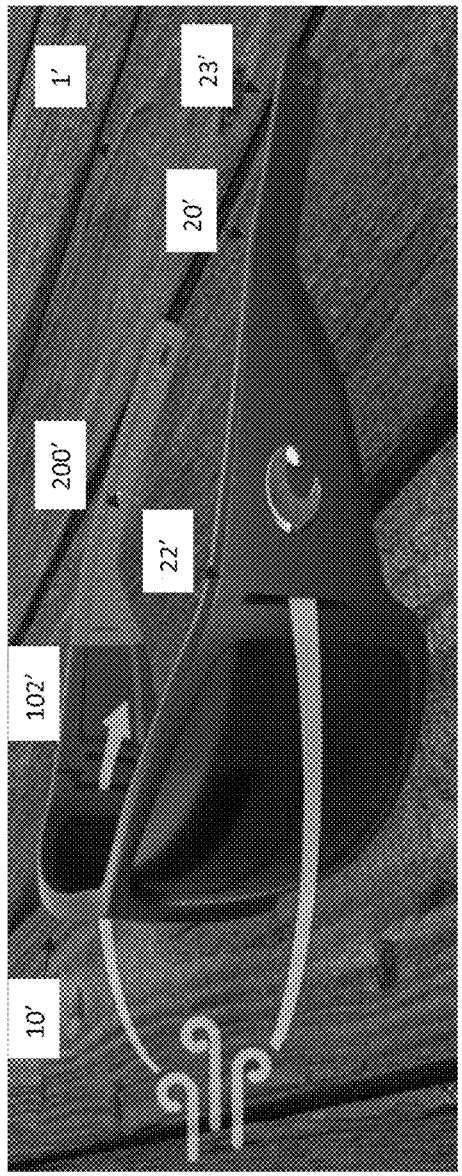
FIG. 2E is a perspective view of the embodiment depicted in FIGS. 2A-2D.
Figure 2F:
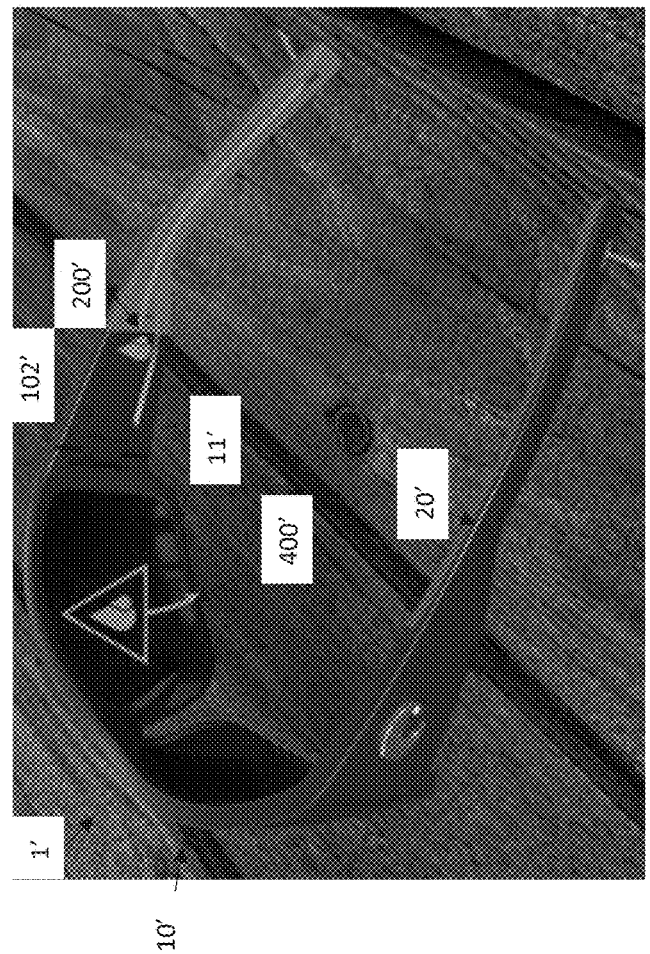
FIG. 2F is a perspective view of the embodiment depicted in FIGS. 2A-2E.

As can be seen best in FIGS. 1B and 1F, along the inner face 6 of the front element 10, the eye wire 11 serves to retain the lower portion of the lens. As such, a certain thickness of material is generally desired in order to securely encase the lower portion of the lens. Yet, as discussed, this can create a surface upon which moisture may collect, a problem that is exacerbated if the wearer's cheek rests against the eye wire 11. Accordingly, the eye wire of the present invention includes a recessed portion 400 in which a minimum dimension of material is utilized to retain the lens against the eye wire 11. In the depicted embodiment, the recessed portion 400 does not run along the entire length of the eye wire 11 but is only included at the lower portions to facilitate drainage. The remaining portion of the eye wire 11 may be of larger dimension, as desired, to provide rigidity and secure the lens.

Some portions of the frame 1 may utilize rubber or rubberized surfaces to facilitate adherence to a wearer, in particular, nose rubber 14 disposed on the nose pad 13 and temple bar rubber 21 disposed on the inner surface 16 of the temple bar 20. The depicted embodiment includes ridges 500 disposed on the surface of the nose rubber 14 and temple bar rubber 21. The ridges 500, which may be at least partially defined by debosses in the surface of the rubber, facilitate drainage of moisture and increase mechanical grip on the wearer.

Now turning to FIGS. 2A-2F, various features and elements of the present invention are depicted on another embodiment of a frame 1'. The depicted frame 1' includes an outer face 5', and inner face 6', a front element 10', and a pair of temple bars 20'. The ventilation apertures 100' are narrower in dimension than as depicted in the embodiment of FIG. 1A and, due to the curvature of the front element 10' in the embodiment of FIGS. 2A-2F, the inlets 101' are oriented substantially perpendicularly to the temple bars 20', while the outlets 102' have been dimensioned and configured to direct air flow generally along the temple bars 20'.

Additionally, the fluid channel 200' of the depicted embodiment is not in direct fluid communication with the ventilation aperture 100'. Rather, the fluid channel 200' begins at a proximal end 22' of the temple bar 20' and ends at the distal end 23' of the temple bar 20'. It will be appreciated that the fluid channels 200' may be dimensioned and configured such that the face of a wearer will not create a seal against the fluid channel and, therefore, fluid may enter the fluid channel 200' at the proximal end 22' without requiring a direct, fluid communication with the ventilation aperture 100'. The depicted embodiment offers the advantages of the present invention in a differing aesthetic than, e.g., that depicted in FIGS. 1A-1F, due to, inter alia, the reduced dimension of the ventilation apertures 100', especially as compared to the ventilation apertures 100 in FIGS. 1A-1F.

With regard to FIGS. 3A-3B, eyewear in accordance with yet another embodiment of the present invention is depicted. The frame 1" includes a front element 10" and temple bars 20". The ventilation aperture 100" includes an outlet 102" that is disposed in direct, fluid communication with the fluid channel 200". The fluid channel 200" terminates on the distal end 23" of the temple bar 20", even though, in the depicted embodiment, the fluid channel 200" is not disposed in fluid communication with a drain aperture. The depicted embodiment also includes a peripheral shade 600" along the upper edge of the inner face 6". The peripheral shade 600" may include a protrusion along the front element 10" and/or temple bar 20" which blocks additional light from a peripheral direction.

Figure 4A:
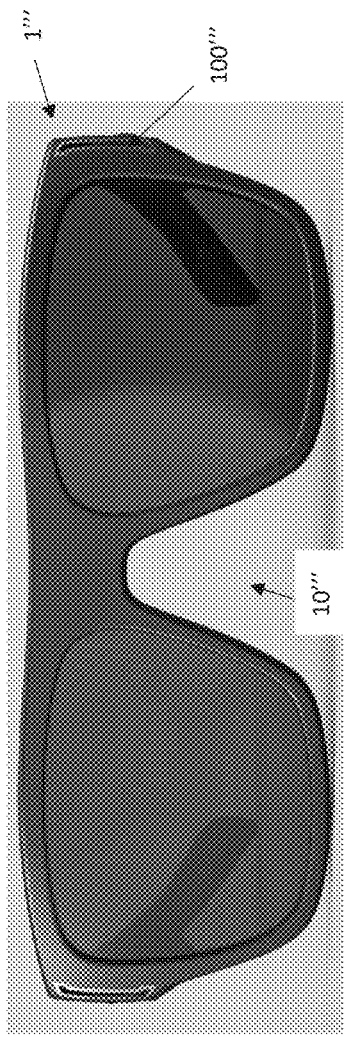
FIG. 4A is a perspective view of eyewear in accordance with another embodiment of the present invention.
Figure 4B:
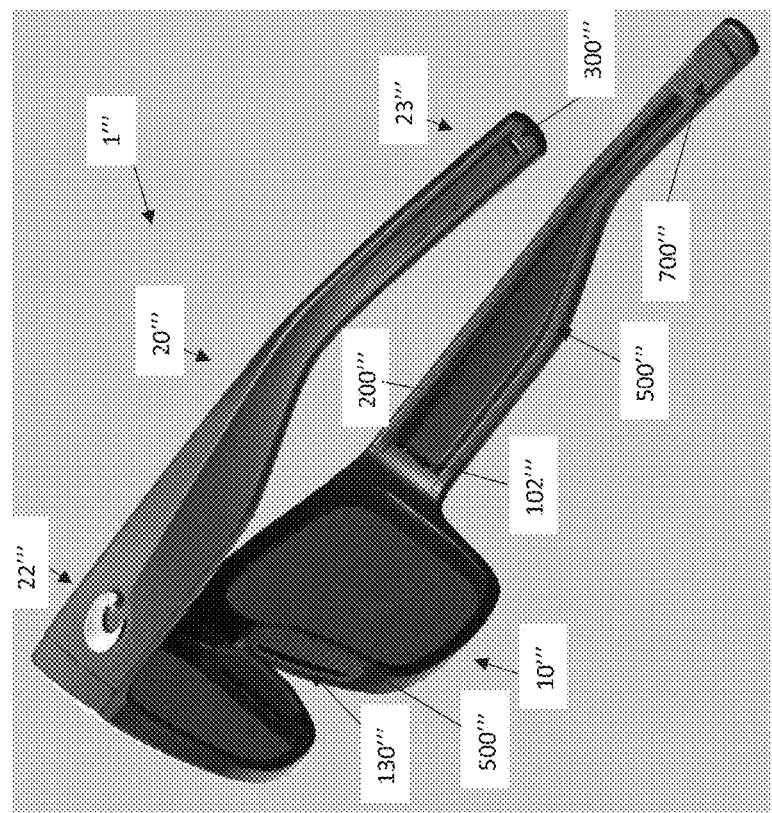
FIG. 4B is a perspective view of the embodiment depicted in FIG. 4A.

With regard to FIGS. 4A-4B, eyewear in accordance with yet another embodiment of the present invention is depicted. The frame 1''' includes a front element 10''' and temple bars 20'''. As can be seen, the ventilation aperture 100''' includes an outlet 102''' that is disposed in direct, fluid communication with the fluid channel 200'''. The fluid channel 200''' is further disposed in fluid communication with a drain aperture 300'''. As can be seen, the fluid channel 200''' is only exposed to a wearer along a portion of its length, due to the covering portion 700''', at the distal end 23''', which in the depicted embodiment includes a portion of the temple bar rubber. Additionally, the depicted embodiment includes a nose pad ventilation aperture 130''' disposed through the nose pad which facilitates air circulation and heat exchange therethrough. Also, the depicted embodiment includes ridges 500''' disposed on the surface of the nose rubber and temple bar rubber, as described in greater detail with reference to FIGS. 1B and 1C.

Figure 5A:
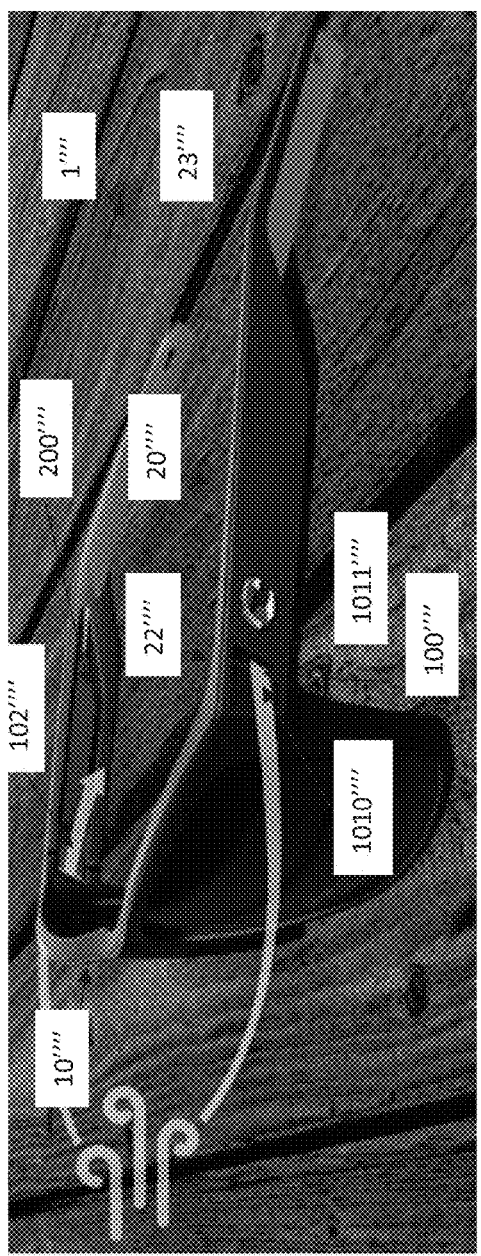
FIG. 5A is a perspective view of eyewear in accordance with another embodiment of the present invention.
Figure 5B:
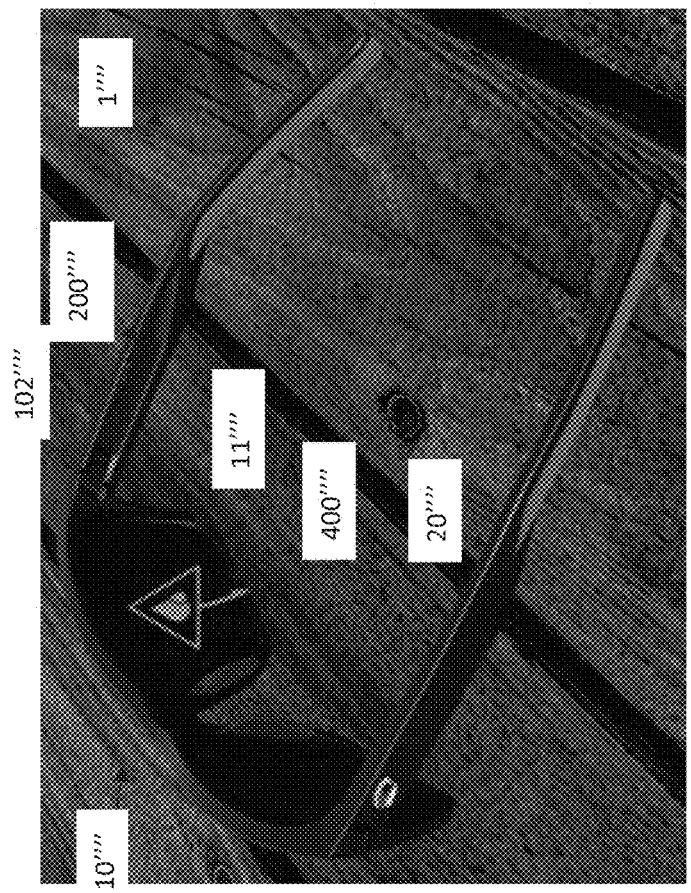
FIG. 5B is a perspective view of the embodiment depicted in FIG. 5A.

Now turning to FIGS. 5A-5B, depicted therein are the operative features of the present invention deployed on yet another embodiment of a frame 1''''. As such, the features and objectives of the present invention may be applied to enhance styles of eyewear other than those strictly developed for active situations. Specifically, a frame 1'''' is depicted with geometries and proportions selected more for aesthetic appearance, rather than performance. By way of example, the curvature of the front element 10'''' is not as severe as those depicted in FIGS. 1A-2F. Additionally, the temple bars 20'''' are relatively short in height, being selected for aesthetic qualities rather than light-blocking characteristics. However, as can be seen, ventilation apertures 100'''' are disposed through the proximal end 22'''' of the temple bars 20''''. Given that the temple bars 20'''' will not block a significant portion of peripheral light in the depicted embodiment, whether peripheral light is allowed to enter the ventilation aperture 100'''' is less of a concern. Accordingly, the ventilation aperture 100'''', along with the shape and geometry of its inlet 101'''' and outlet 102'''' can be optimized for airflow therethrough. Additionally, the ventilation aperture 100'''' is disposed across both the front element 10'''' and temple bar 20'''', with the proximal side 1010'''' disposed on the front element 10'''' and the distal side 1011'''' disposed on the temple bar 20''''.

The fluid channels 200'''' are, in the depicted embodiment, disposed in direct fluid communication with the ventilation apertures 100'''' yet do not extend substantially along the temple bars 20'''', but terminate between the proximal 22'''' and distal 23'''' ends.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. Eyewear comprising:
   a frame including an outer face, and an inner face, said frame further including a front element structured to be disposed in front of a wearer's corneas, and at least one temple bar connected to said front element;
   at least one ventilation aperture in said frame operative to dispose said outer face in fluid communication with said inner face;
   a fluid channel disposed in said temple bar;
   said at least one ventilation aperture disposed in fluid communication with said fluid channel so as to direct fluid from said ventilation aperture into said fluid channel;
   said fluid channel and said outer face disposed in fluid communication with at least one drain aperture such that said drain aperture is operatively oriented between said fluid channel and said outer face; and
   said at least one drain aperture disposed on a distal end of said temple bar.

2. The eyewear as recited in claim 1 wherein said fluid channel is disposed in fluid communication with the inner face of the temple bar so as to conduct fluid therethrough, away from the wearer.

3. The eyewear as recited in claim 2 wherein a depth of said fluid channel is less than a thickness of the temple bar.

4. The eyewear as recited in claim 1 wherein said fluid channel extends along a substantial portion of the temple bar.

5. The eyewear as recited in claim 1 wherein said ventilation aperture is disposed adjacent to an eye wire of said front element.

6. The eyewear frame as recited in claim 1 wherein said ventilation aperture is disposed at least partially within said temple bar.

7. The eyewear as recited in claim 1 wherein said ventilation aperture is disposed in said front element.

8. The eyewear as recited in claim 1 wherein said ventilation aperture is disposed between said front element and said temple bar.

9. The eyewear as recited in claim 1 wherein said ventilation aperture includes at least an inlet and an outlet; said inlet disposed on the outer face of the frame, said outlet disposed on the inner face of the frame.

10. The eyewear as recited in claim 9 wherein said inlet and said outlet of said ventilation aperture are correspondingly dimensioned and configured to at least partially obscure light that would otherwise enter a wearer's peripheral vision.

11. The eyewear as recited in claim 9 wherein said inlet and said outlet of said ventilation aperture are correspondingly dimensioned and configured to at least partially obscure light from a peripheral direction relative to the wearer.

12. The eyewear as recited in claim 1 wherein said at least one drain aperture is disposed in fluid communication with said inner surface of said frame via said fluid channel so as to conduct fluid away from the wearer.

13. The eyewear as recited in claim 1 further comprising an eye wire including an at least partially recessed portion structured to allow fluid drainage therefrom.

14. The eyewear as recited in claim 1 further comprising ridges disposed on at least portions of nose rubber of said frame.

15. The eyewear as recited in claim 1 further comprising ridges disposed on at least portions of temple bar rubber of said frame.

16. The eyewear as recited in claim 1 further comprising at least one peripheral shade.

17. The eyewear as recited in claim 1 further comprising at least one nose pad ventilation aperture.

18. Eyewear comprising:
   a frame including an outer face and an inner face, said frame further including a front element structured to be disposed in front of a wearer's corneas, a pair of temple bars connected to said front element;
   a plurality of ventilation apertures disposed in said frame and a plurality of fluid channels disposed in said temple bars, said ventilation apertures disposed in fluid communication with corresponding ones of said fluid channels;
   said plurality of ventilation apertures dimensioned and configured to conduct fluid from said outer face of said frame to said inner face;
   said plurality of fluid channels and said outer face disposed in fluid communication with at least one drain aperture such that said drain aperture is operatively oriented between said plurality of fluid channels and said outer face;
   said at least one drain aperture disposed on a distal end of said pair of temple bars; and
   said plurality of fluid channels disposed at least partially in fluid communication with the wearer and dimensioned and configured to conduct fluid therealong, thereby facilitating heat exchange with the wearer.

19. The ventilated eyewear frame of claim 18 further comprising a drain aperture disposed in fluid communication with a corresponding one of said plurality of fluid channels.

20. The ventilated eyewear frame of claim 18 wherein said frame comprises a nose rubber, said nose rubber comprising a ridged surface.

21. The ventilated eyewear frame of claim 18 wherein said frame comprises a temple bar rubber, said temple bar rubber comprising a ridged surface.

22. Eyewear comprising:
   a frame including an outer face and an inner face, said frame further including a front element structured to be disposed in front of a wearer's corneas, a pair of temple bars connected to said front element;
   at least one ventilation aperture including an inlet and outlet;
   said ventilation aperture configured and dimensioned to conduct fluid into communication with a wearer;

a plurality of fluid channels disposed in said pair of temple bars;

said inlet defined at least partially by a proximal side and a distal side;

said ventilation aperture at least partially defined by an inner surface thereof;

said inner surface extending from said inlet to said outlet;

said plurality of fluid channels and said outer face disposed in fluid communication with at least one drain aperture such that said drain aperture is operatively oriented between said plurality of fluid channels and said outer face;

said at least one drain aperture disposed on a distal end of said pair of temple bars; and said inner surface operative to at least partially block peripheral light traveling in a direction of a wearer's cornea.

23. The eyewear as recited in claim 22 wherein said inner surface extends rearward from said outer face at least as far as said distal side of said ventilation aperture.

24. Eyewear comprising:
a frame including an outer face, and an inner face, said frame further including a front element structured to be disposed in front of a wearer's corneas, and at least one temple bar connected to said front element;

at least one ventilation aperture in said frame operative to dispose said outer face in fluid communication with said inner face;

a fluid channel disposed in said temple bar;

said at least one ventilation aperture disposed in fluid communication with said fluid channel so as to direct fluid from said ventilation aperture into said fluid channel;

said fluid channel and said outer face disposed in fluid communication with at least one drain aperture such that said drain aperture is operatively oriented between said fluid channel and said outer face;

said at least one drain aperture disposed on a distal end of said temple bar; and said at least one drain aperture disposed in fluid communication with said inner face of said ventilation aperture via said fluid channel so as to conduct fluid away from the wearer.

* * * * *